(12) United States Patent
Cho

(10) Patent No.: US 7,386,583 B2
(45) Date of Patent: Jun. 10, 2008

(54) CARRY GENERATOR BASED ON XOR, AND CONDITIONAL SELECT ADDER USING THE CARRY GENERATOR, AND METHOD THEREFOR

(75) Inventor: Ki-seon Cho, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 991 days.

(21) Appl. No.: 10/201,265

(22) Filed: Jul. 24, 2002

(65) Prior Publication Data

US 2003/0154229 A1     Aug. 14, 2003

(30) Foreign Application Priority Data

Jan. 16, 2002    (KR)  ................................. 2002-2538

(51) Int. Cl.
*G06F 7/50*        (2006.01)
(52) U.S. Cl. ..................................................... 708/700
(58) Field of Classification Search ......... 708/700–714
See application file for complete search history.

(56) References Cited

U.S. PATENT DOCUMENTS

| | | | | |
|---|---|---|---|---|
| 5,126,965 A | * | 6/1992 | Asato et al. ................. | 708/714 |
| 5,272,662 A | * | 12/1993 | Scriber et al. ............... | 708/714 |
| 5,629,886 A | * | 5/1997 | New ........................... | 708/711 |
| 5,631,860 A | | 5/1997 | Morinaka | |
| 5,852,568 A | * | 12/1998 | Ranjan ........................ | 708/714 |
| 6,012,079 A | * | 1/2000 | Song ........................... | 708/714 |
| 6,125,381 A | * | 9/2000 | Paysan ........................ | 708/714 |
| 6,446,107 B1 | * | 9/2002 | Knowles ...................... | 708/707 |
| 6,466,960 B1 | * | 10/2002 | Winters ....................... | 708/671 |

FOREIGN PATENT DOCUMENTS

EP        0849663 A2     6/1999

OTHER PUBLICATIONS

Completion-detecting carry select addition, IEE Proc.-Comput. Digit. Tech, vol. 147, No. 2, Mar. 2000, pp. 93-100, Authors: A. De Gloria and M. Olivieri.
A 4.4 ns CMOS 54×54-B Multiplier Using Pass-Transistor Multiplexer, Norio Ohkubo et al., IEEE Journal of Solid-State Circuits, Mar. 30, 1995, No. 3, New York, pp. 251-256 E.

* cited by examiner

*Primary Examiner*—Chat C. Do
(74) *Attorney, Agent, or Firm*—Sughrue Mion, PLLC

(57) ABSTRACT

A conditional select adder having a carry generating unit which generates a carry of two n-bit input data units $X_0$-$X_{n-1}$, and $Y_0$-$Y_{n-1}$, and a sum generating unit which generates the sum of the input data, is provided. The carry generating unit comprises a first input unit which receives predetermined data based on the input data $X_i$ and $Y_i$; a second input unit which receives the initial carry; and a selection unit which receives the result of performing an XOR operation on the input data $X_i$ and $Y_i$, in which according to the XOR result, either predetermined data based on the input data $X_i$ and $Y_i$ input to the first input unit, or the initial carry input to the second input unit is selected and output as a carry. The sum generating unit calculates a sum using the carry generated by the carry generating unit. Advantages include reducing power consumption, chip area, logic count, and delay time.

20 Claims, 10 Drawing Sheets

CARRY GENERATOR BASED ON XOR, AND CONDITIONAL SELECT ADDER USING THE CARRY GENERATOR, AND METHOD THEREFOR

BACKGROUND OF THE INVENTION

1. Field of the Invention

The present invention relates to digital signal processing, and more particularly, to a conditional select adder of a digital signal processor which can reduce current consumption and delay time, and a method therefor. The present invention is based on Korean Patent Application No. 2002-2538, which is incorporated herein by reference.

2. Description of the Related Art

Recently, circuit design technology for high speed multi-bit addition or multiplication has become important for performing calculation functions in a high-speed Digital Signal Processor (DSP). Among the calculations, addition is one of the essential operations of data path blocks in a computer system or a microprocessor system, and has a great influence on the speed performance of a system. In the prior art, current consumption and delay time in calculation are not satisfactory. Also, in recent ultra precision processes, delay time due to wiring is more important than cell delay time, and therefore it is necessary to design a circuit so as to reduce internal wiring of an adder.

FIG. 1 is a schematic diagram of a prior art 64-bit conditional select adder 100. Referring to FIG. 1, the conditional select adder 100 has a plurality of conditional selection addition modules 110 through 180, each of which generates a carry by analyzing input values to be added, and calculates a sum according to the presence of the carry, and a block carry generating block 190 which, in response to the carries generated by the conditional selection addition modules, determines the presence of the carry and feeds the result back to the conditional selection addition module.

Each of the conditional select addition modules 110 through 180 has a pre-carry-sum generating block 112 which analyzes input values to be added and generates appropriate values in advance, a sum generating block 114 which obtains a limit of the value generated by the pre-carry-sum generating block 112, but obtains a sum in each case according to the presence of a carry, and a carry generating block 116 which obtains a carry in response to a value generated by the pre-carry-sum generating block 112.

The pre-carry-sum generating block 112 of a first conditional select addition module 110 analyzes input values to be added in the first conditional select addition module 110, and adds an appropriate value in advance. At this time, the sum generating block 114 generates a sum when there is a carry and a sum when there is no carry, and the carry generating block 116 outputs the carry of the first conditional select addition module 110 to the block carry generating block 190.

Also, the pre-carry-sum generating blocks of the remaining conditional select addition modules 120 through 180 analyze input values to be added in the respective conditional select addition modules 120 through 180, and perform addition with appropriate values in advance. At this time, the sum generating block generates a sum when there is a carry, and a sum when there is no carry, and the carry generating block outputs the carry of each conditional select addition module to the block carry generating block 190.

The block carry generating block 190 receives carries from 8-bit conditional select additional modules 110 through 180 and feeds the presence of a carry back to the conditional select addition module of the next stage. As a result, the appropriate sum according to the presence of a carry is selected from among sums which are calculated in advance in the sum generating block 110 of each of the 8-bit conditional select addition modules 110 through 180.

FIG. 2 is a block diagram of the sum generating block 114 of the 8-bit conditional select adder module shown in FIG. 1. The sum generating block 114 shown in FIG. 2 is formed with multiplexers using Pass Transistor Logic (PTL) based on an NMOS transistor, and uses Level Restore Blocks (LRBs) appropriate to the driving capability of a multiplexer for low power consumption and high speed operation. Here, M denotes a multiplexer, S denotes single, D denotes double, and L denotes a level restore block. For example, MS means a single multiplexer, and MDL means a double multiplexer having a level restore block.

FIG. 3 is a block diagram of a carry generating block 116 of the 8-bit conditional select adder module shown in FIG. 1, and FIG. 4 is a block diagram of a block carry generating block 190 shown in FIG. 1.

As shown in FIGS. 1 through 3, in the prior art adder, a carry is calculated in both the sum generating block 114 and the carry generating block 116. Therefore, since separate carry generating logic must be designed into the sum generating block 114, wiring becomes complicated and more logic is used. Also, in the prior art adder as shown in FIG. 5, in order to calculate a carry in the carry generating block 116, XNOR, XOR, AND, NAND, OR, and NOR logic operations are needed, and the pre-carry-sum generating block 112 includes logic gates such as XNOR, XOR, AND, NAND, OR, and NOR. Therefore, fan-outs of input signals 'X, Y' increase and wiring becomes complicated.

Also, since the prior art adder is based on PTL, wiring must be complicated in order to calculate a carry and a sum, and physical wire delay increases the overall delay time and consumes more space. In addition, since PTL is used, an inverted signal is always needed, which increases wiring and power consumption. Also, the block carries (BC0, BC1, BC2, BC3, BC4, BC5, BC6, and BC7) generated in the block carry generating block 190 shown in FIG. 4 are not output in synchronization, and therefore the generation of sums in the respective modules are also not synchronized.

SUMMARY OF THE INVENTION

To solve the above problems, it is a first objective of the present invention to provide a carry generator which reduces power consumption, chip area, logic use, and delay time, and a method therefor.

It is a second objective of the present invention to provide a carry generator and a sum generator which reduce power consumption, chip area, logic use, and delay time, and a conditional select adder using the carry generator and the sum generator.

To accomplish the first objective of the present invention, there is provided a carry generator for generating a carry of $X_i$ and $Y_i$ according to an initial carry, the carry generator comprising a first input unit which receives predetermined data based on the input data $X_i$ and $Y_i$; a second input unit which receives the initial carry; and a selection unit which receives the result of performing an XOR operation on the input data $X_i$ and $Y_i$, in which according to the XOR result, either predetermined data based on the input data $X_i$ and $Y_i$ input to the first input unit, or the initial carry input to the second input unit is selected and output as a carry.

Also, to accomplish the first objective of the present invention, there is provided another carry generator which generates a carry of two n-bit input data units $X_0$-$X_{n-1}$, and $Y_0$-$Y_{n-1}$, the carry generator comprising one or more first sub-carry generating units, each of which comprises a first input unit which receives data based on input data $X_{2i-1}$ and $Y_{2i-1}$; a second input unit which receives initial carry data; and a selection unit which receives the result of performing an XOR operation on the input data $X_{2i-1}$ and $Y_{2i-1}$, in which according to the XOR result, the first sub-carry generating unit selects either data based on input data $X_{2i-1}$ and $Y_{2i-1}$ input to the first input unit, or the initial carry data input to the second input unit, and outputs the selected data.

To accomplish the second objective of the present invention, there is provided a conditional select adder which comprises a plurality of addition modules, each of which has a carry generating unit which generates the carry of two n-bit input data units $X_0$-$X_{n-1}$, and $Y_0$-$Y_{n-1}$, and a sum generating unit which generates the sum of the input values; and a block carry generating unit which in response to the carries generated by the addition modules, determines the presence of a carry of each of the addition modules, and feeds the result back to the next stage addition module, in which each carry generating unit comprises one or more first sub-carry generating units, each of which comprises a first input unit which receives data based on input data $X_{2i-1}$ and $Y_{2i-1}$; a second input unit which receives initial carry data; and a selection unit which receives the result of performing an XOR operation on the input data $X_{2i-1}$ and $Y_{2i-1}$, in which according to the XOR result input to the selection unit, the first sub-carry generating unit selects either data based on the input data $X_{2i-1}$ and $Y_{2i-1}$ input to the first input unit, or the initial carry data input to the second input unit, and outputs the selected data; one or more second sub-carry generating units, each of which comprises a first input unit which receives initial carry data; a second input unit which receives data based on input data $X_{2i-1}$ and $Y_{2i-1}$; and a selection unit which receives the result of performing an XNOR operation on the input data $X_{2i-1}$ and $Y_{2i-1}$, in which according to the XNOR result input to the selection unit, the second sub-carry generating unit selects either the initial carry data input to the first input unit or the data based on input data $X_{2i-1}$ and $Y_{2i-1}$ input to the second input unit, and outputs the selected data; and one or more carry selection units, each of which has two input units to which the outputs of the first sub-carry generating unit and the second sub-carry generating unit are input, and a selection unit to which a predetermined selection signal is input, in which according to the selection signal input to the selection unit, one of the values input to the input units is output.

Also, to accomplish the second objective of the present invention, there is provided another carry generating method which is used in an addition apparatus and generates a carry of Xi and Yi according to an initial carry, the carry generating method comprising (a) calculating predetermined data based on input data Xi and Yi; (b) determining whether the input data units Xi and Yi are identical; (c) according to whether the input data Xi and Yi are identical, selecting either the initial carry or the predetermined data based on input data Xi and Yi, as the carry of Xi and Yi, and outputting the selected data.

Also, to accomplish the second objective of the present invention, there is provided another carry generating method which is used in an addition apparatus and generates a carry of two n-bit input data units $X_0$-$X_{n-1}$ and $Y_0$-$Y_{n-1}$, comprising (a) calculating predetermined data based on input data $X_{2i-1}$ and $Y_{2i-1}$; (b) calculating first initial carry data of input data $X_{2i-1}$ and $Y_{2i-1}$; (c) calculating the result of performing an XOR operation on input data $X_{2i-1}$ and $Y_{2i-1}$; and (d) according to the calculated result of performing an XOR operation on input data $X_{2i-1}$ and $Y_{2i-1}$, selecting either the data based on input data $X_{2i-1}$ and $Y_{2i-1}$, or the first initial carry data, and outputting the selected data as a first carry.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 6:
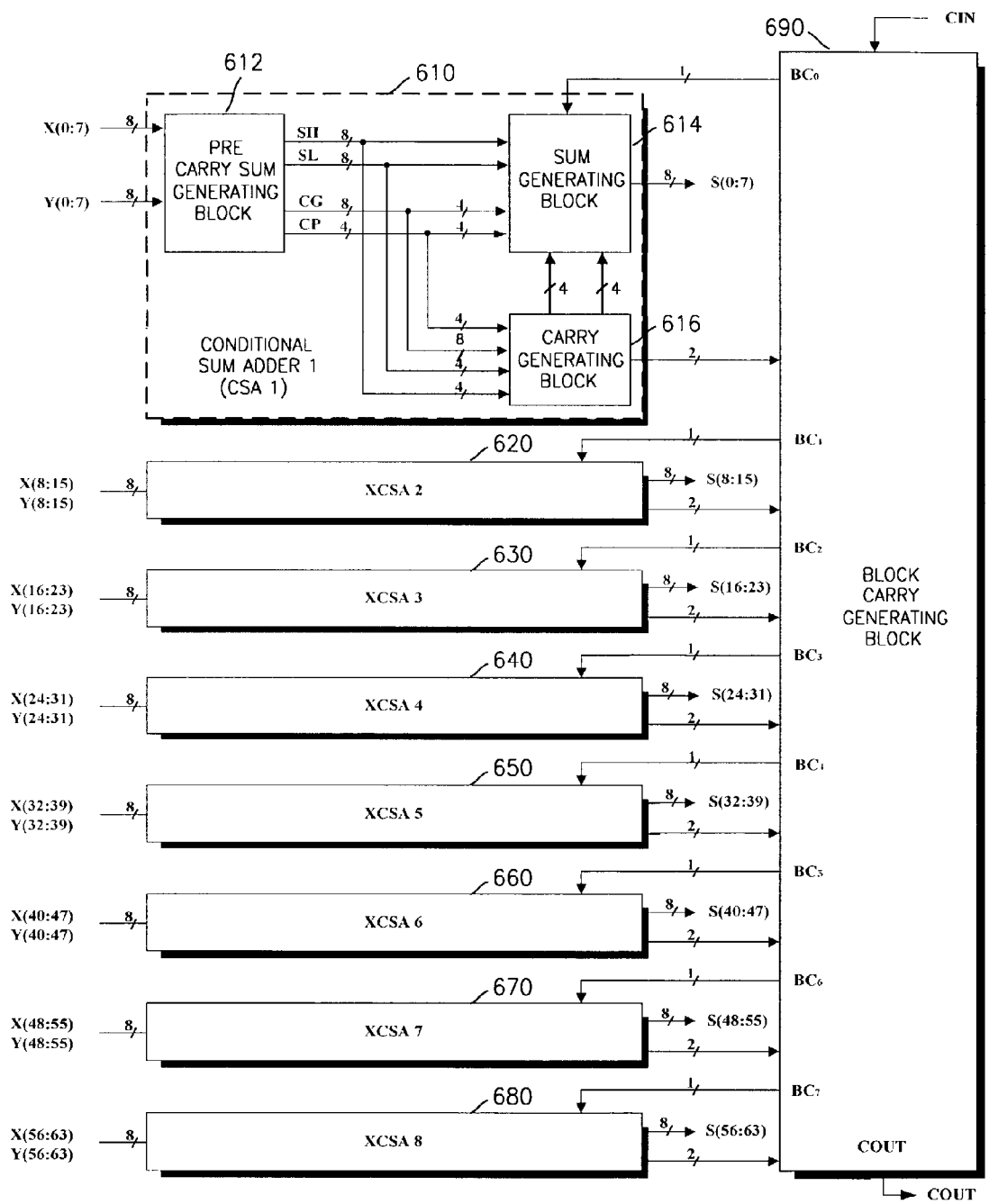
FIG. 6 is a block diagram of a 64-bit conditional select adder module according to the present invention.

FIG. 6 is a block diagram of a 64-bit conditional select adder module according to the present invention. The conditional select adder 600 of FIG. 6 has a plurality conditional select addition modules 610 through 680 which analyze input values to be added and obtain a sum according to the presence of a carry, and a block carry generating block 690 which, in response to the carries generated in the conditional select addition modules, determines the presence of a carry and feeds the result back to the next stage conditional select addition module.

Each of the conditional select addition modules 610 through 680 has a pre-carry-sum generating block 612 which analyzes input values to be added and generates an appropriate value in advance, a sum generating block 614 which obtains the sum of a value generated by the pre-carry-sum generating block 612, but obtains a sum for each case according to the presence of a carry, and a carry generating block 616 which obtains a carry in response to a value generated by the pre-carry-sum generating block 612.

The pre-carry-sum generating block 612 of the first conditional select addition module 610 analyzes input values to be added in the first conditional select addition module, and adds an appropriate value in advance. At this time, the sum generating block 614 generates a sum when there is a carry and a sum when there is no carry, and the carry generating block 616 outputs the carry of the first conditional select addition module 610 to the block carry generating block 690.

The basic operation of the carry generating block 616 is described by the following truth table 1:

TABLE 1

| $X_n$ | $Y_n$ | $Cin_n$ | $SUM_n$ | $Cout_n$ |
|---|---|---|---|---|
| 0 | 0 | 0 | 0 | 0 |
| 0 | 1 | 0 | 1 | 0 |
| 1 | 0 | 0 | 1 | 0 |
| 1 | 1 | 0 | 0 | 1 |
| 0 | 0 | 1 | 1 | 0 |
| 0 | 1 | 1 | 0 | 1 |
| 1 | 0 | 1 | 0 | 1 |
| 1 | 1 | 1 | 1 | 1 |

According to truth table 1, the relation between $Cout_n$ and $Cin_n$ is the following equation:

$$Cout_n = (X_n \text{ AND } Y_n) \cdot \sim Cin_n + (X_n \text{ OR } Y_n) \cdot Cin_n$$

Also, the basic operation of the carry generating block 616 is shown in the following truth table 2:

TABLE 2

| $X_n$ | $Y_n$ | $Cin_n$ | XOR | $SUM_n$ | $Cout_n$ |
|---|---|---|---|---|---|
| 0 | 0 | 0 | 0 | 0 | $X_n$ |
| 0 | 1 | 0 | 1 | 1 | $Cin_n$ |
| 1 | 0 | 0 | 1 | 1 | $Cin_n$ |
| 1 | 1 | 0 | 0 | 0 | $X_n$ |
| 0 | 0 | 1 | 0 | 1 | $X_n$ |
| 0 | 1 | 1 | 1 | 0 | $Cin_n$ |
| 1 | 0 | 1 | 1 | 0 | $Cin_n$ |
| 1 | 1 | 1 | 0 | 1 | $X_n$ |

If carry calculation according to the truth table 2 is considered based on XOR, the following relations can be known.

That is, if XOR is '1', the generated carry $Cout_n$ is the same as $Cin_n$ and if XOR is '0', $Cout_n$ is the same as input data $X_n$. Also, if XOR is '0', even though $Cout_n$ is made to have the same value as input data $Y_n$, or the result of performing an OR operation on input data $X_n$ and $Y_n$, the result is the same.

Also, if carry calculation according to the truth table 2 is considered based on XNOR, the following relations can be known.

That is, if XNOR is '0', $Cout_n$ is the same as $Cin_n$ and if XNOR is '1', $Cout_n$ is the same as input data $X_n$. Also, if XNOR is '1', even though $Cout_n$ is made to have the same value as input data $Y_n$, or the result of performing an OR operation on input data $X_n$ and $Y_n$, the result is the same.

Figure 8:
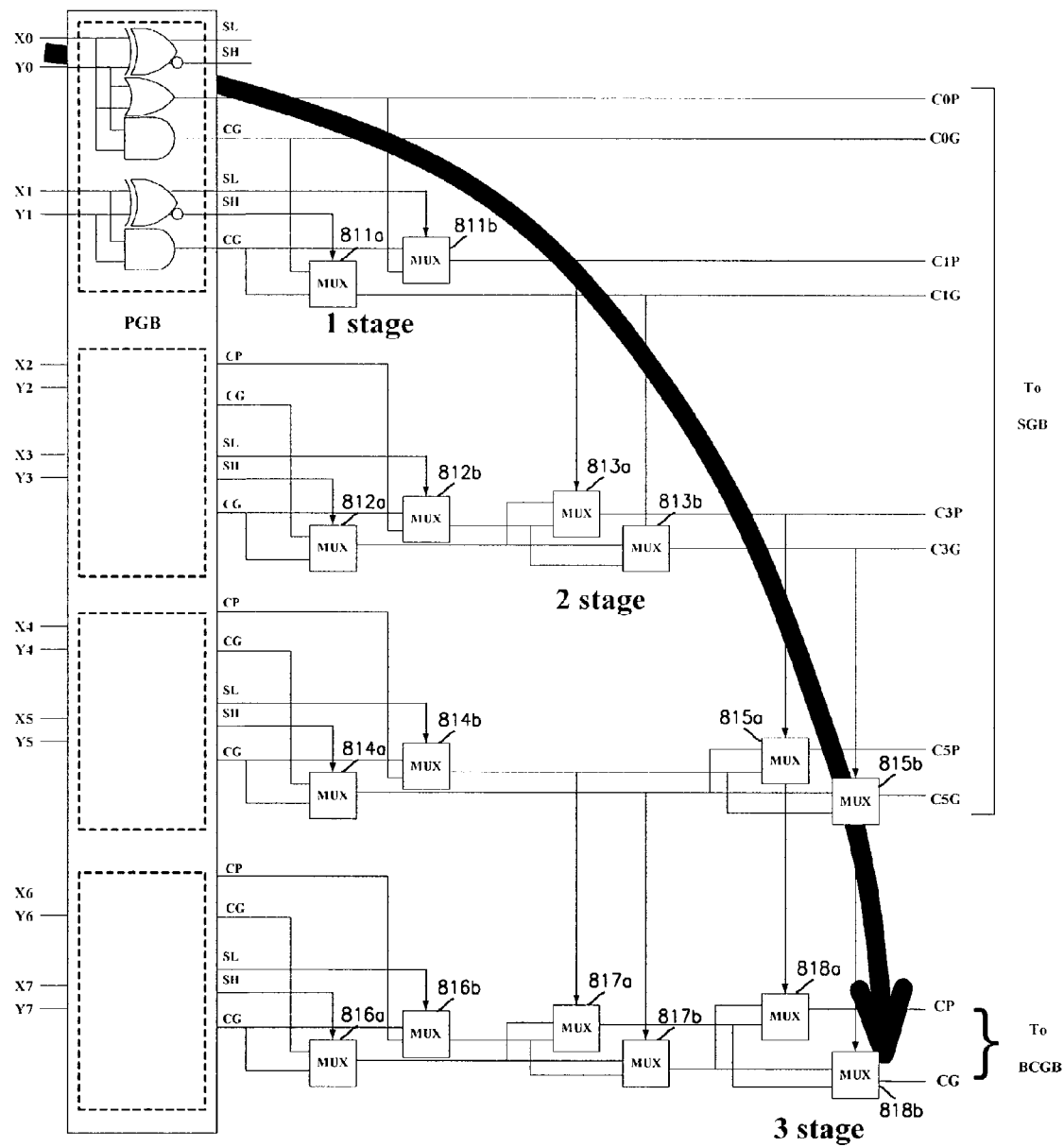
FIG. 8 is a block diagram of a carry generating block of an 8-bit conditional select adder module shown in FIG. 6.

FIG. 8 is a block diagram of a carry generating block 616 designed using the relationship described above. That is, the carry generating block 616 receives XNOR value SH, XOR value SL, OR value CP, and AND value CG of data $X_n$ and $Y_n$ having a predetermined bit, then calculates carry propagation value $CP_0$ and carry generation value $CG_0$ using the received values, and outputs the calculated values to the block carry generating block 690.

Also, as shown in FIG. 8, the carry generating block 616 generates carry propagation value C0P and carry generation value C0G from input data $X_0$ and $Y_0$, and outputs the generated values to multiplexers (MUX) based on CMOS for calculating carry propagation value C1P and carry generation value C1G of the next input data $X_1$ and $Y_1$, and the sum generating block (SGB) 614.

Each of the multiplexers according to the present embodiment has a selection unit, a first input unit and a second input unit. If the value of a select signal input to the selection unit is '0', a signal input to the first input unit is selected and output, and if the value of the select signal is '1', a signal input to the second input unit is selected and output.

The carry generation value C0G which is generated in the above step is input to the first input unit of the MUX 811a, which functions as a sub-carry generating unit for outputting a carry generation value, in order to calculate carry generation value C1G, and the result of performing an OR operation on input data $X_1$ and $Y_1$ is input to the second input unit of the MUX 811a. The result of performing an XNOR operation on the input data $X_1$ and $Y_1$ is input to the selection unit of the MUX 811a, and according to the XNOR result input, either the carry generation value C0G input to the first input unit or the result of performing an OR operation on input data $X_1$ and $Y_1$ input to the second input unit is selectively output.

According to the present embodiment, when the result of performing an XNOR operation on input data $X_1$ and $Y_1$ is '0', the carry generation value C0G input to the first input unit is output, and when the result of performing an XNOR operation on input data $X_1$ and $Y_1$ is '1', the result of performing an OR operation on input data $X_1$ and $Y_1$ input to the second input unit is output. The output value of the MUX 811a is output as the C1G value which is the carry propagation value of input data $X_1$ and $Y_1$, to the sum generating block 614, and used in calculating the sum of input data $X_1$ and $Y_1$.

In another embodiment of the present invention, when the result of performing an XNOR operation on input data $X_1$ and $Y_1$ is '1', the output is either input data $X_1$ and $Y_1$, or the result of performing an OR operation on input data $X_1$ and $Y_1$.

Also, the generated carry propagation value C0P is input to the second input unit of the MUX 811b which functions as a sub-carry generating unit for outputting a carry propagation value as shown in FIG. 8, in order to calculate carry propagation value C1P, and the result of performing an AND operation on input data $X_1$ and $Y_1$ is input to the first input unit of the MUX 811b. The result of performing an XOR operation on input data $X_1$ and $Y_1$ is input to the selection unit of the MUX 811b, and according to the XOR result input, either the result of performing an OR operation on input data $X_1$ and $Y_1$ or the carry propagation value COP is selectively output.

In the present embodiment, when the result of performing an XOR operation on input data $X_1$ and $Y_1$ is '0', the result of performing an AND operation on input data $X_1$ and $Y_1$ input to the first input unit is selected and output, and when the result of performing an XOR operation on input data $X_1$ and $Y_1$ is '1', the carry propagation value C0P input to the second input unit is selected and output. The output value of the MUX 811b is output as C1P, which is the carry propagation value of input data $X_1$ and $Y_1$, to the sum generating block 614, and is used in calculating the sum of input data $X_1$ and $Y_1$.

In another embodiment of the present invention, when the result of performing an XOR operation on input data $X_1$ and $Y_1$ is '0', the output is either input data $X_1$ and $Y_1$, or the result of performing an OR operation on input data $X_1$ and $Y_1$.

Likewise, thus generated carry propagation value C1P and carry generation value C1G are output to the MUXs 813a and 813b and the sum generating block 614 for calculating carry propagation C3P and carry generation C3G of input data $X_2$, $Y_2$, $X_3$, and $Y_3$.

Also, carry propagation value CP and carry generation value CG of input data $X_2$ and $Y_2$ generated in the pre-carry-sum generating block 612 are output to the MUXs 812a and 812b for calculating carry propagation C3P and carry generation C3G of next input data $X_3$, and $Y_3$.

The carry generation value CG generated in the above step is input to the first input unit of the MUX 812a, and the result of performing an OR operation on input data $X_3$ and $Y_3$ is input to the second input unit of the MUX 812a. The result of performing an XNOR operation on input data $X_3$ and $Y_3$ is input to the selection unit of the MUX 812, and according to the input XNOR value, either the carry generation value input to the first input unit or the result of performing an AND operation on input data $X_3$ and $Y_3$ input to the second input unit is selectively output.

In the present embodiment, when the result of performing an XNOR operation on input data $X_3$ and $Y_3$ is '0', the carry generation value input to the first input unit is output, and when the result of performing an XNOR operation on input data $X_3$ and $Y_3$ is '1', the result of performing an AND operation on input data $X_3$ and $Y_3$ input to the second input unit is output.

Also, the generated carry propagation value CP of $X_2$ and $Y_2$ is input to the second input unit of the MUX 812b, and the result of performing an AND operation on input data $X_1$ and $Y_1$ is also input to the first input unit of the MUX 812b. The result of performing an XOR operation on input data $X_3$ and $Y_3$ is input to the selection unit of the MUX 812b, and according to the input XNOR value, either the result of performing an AND operation on input data $X_3$ and $Y_3$ input to the first input unit, or the carry propagation value of $X_2$ and $Y_2$ input to the second input unit, is selectively output.

In the present embodiment, when the result of performing an XOR operation on input data $X_3$ and $Y_3$ is '0', the result of performing an AND operation on input data $X_3$ and $Y_3$ input to the first input unit is selected and output, and when the result of performing an XOR operation on input data $X_3$ and $Y_3$ is '1', the carry propagation value input to the second input unit is selected and output.

In another embodiment of the present invention, when the result of performing an XOR operation on input data $X_1$ and $Y_1$ is '0', the output is either input data $X_3$ and $Y_3$, or the result of performing an OR operation on input data $X_3$ and $Y_3$.

Also, the carry generation value C1G output from the MUX 811a is input as a selection signal for generating carry generation value C3G, to the selection unit of MUX 813b. The output of the MUX 812a and the output of the MUX 812b are respectively input to the two input units of the MUX 813b. In the present embodiment, when the selection signal C1G which is input to the MUX 813b is '0', the MUX 813b selects the signal which is output from the MUX 812a and input to the first input unit, and outputs the selected signal as carry generation value C3G for input signals $X_2$, $Y_2$, $X_3$, and $Y_3$. Also, when the selection signal C1G which is input to the MUX 813b is '1', the MUX 813b selects the signal which is output from the MUX 812b and input to the second input unit, and outputs the selected signal as carry generation value C3G for input signals $X_2$, $Y_2$, $X_3$, and $Y_3$. The output carry generation value C3G is output to the sum generating block 614 and the MUX 815b.

Also, the carry generation value C1P output from the MUX 811b is input as a selection signal to the selection unit of the MUX 813a for generating carry propagation value C3P. The output of the MUX 812a and the output of the MUX 812b are respectively input to the two input units of the MUX 813a.

In the present embodiment, when the selection signal C1P input to the MUX 813a is '0', the MUX 813a selects the signal which is output from the MUX 812a and input to the first input unit, and outputs the selected signal as carry propagation value C3P for input signals $X_2$, $Y_2$, $X_3$, and $Y_3$. Also, when the selection signal C1P input to the MUX 813a is '1', the MUX 813a selects the signal which is output from the MUX 812b, and outputs the selected signal as carry propagation value C3P for input signals $X_2$, $Y_2$, $X_3$, and $Y_3$. The output carry generation value C3G is sent to the sum generating block 614 and MUX 815a.

Thus, generated carry propagation value C3P and carry generation value C3G are output to the MUXs 815a and 815b for calculating carry propagation C5P and carry generation C5G of the next input data $X_4$, $Y_4$, $X_5$, and $Y_5$, and the sum generating block 614. Also, the calculated carry propagation C5P and carry generation C5G are output to the MUXs 818a and 818b for calculating the carry propagation value CP and carry generation value CG of the carry generating block, and the calculated CP and CG are output to the block carry generating block 690.

Here, MUXs 814a through 818b perform the same functions as the corresponding MUXs shown in FIG. 8.

Thus, the carry generating block 616 according to FIG. 8 uses no NAND and NOR gates, only XOR, XNOR, OR and AND gates, and calculates a carry using fewer gates and less internal wiring compared to the prior art, with reduced delay time, chip area, and power consumption.

The basic operation of the sum generating block 614 is described by the truth table 2. The sum generating block 614 receives XNOR value SH, XOR value SL, OR value CP, and AND value CG of data $X_n$ and $Y_n$, and carry propagation values (C0P, C1P, C2P, and C3P) and carry generation values (C0G, C1G, C2G, and C3G) from the carry generating block 616, and outputs a sum according to the truth table 2.

According to the truth table 2, the relationship of the input carry value to the sum is described by the following equation:

$$S_n = (X_n \text{ XOR } Y_n) \cdot \sim Cin_n + (X_n \text{ XNOR } Y_n) \cdot \sim Cin_n$$

That is, when the input carry value is '0', sum $S_n$ is the result of performing an XOR operation on input data $X_n$ and $Y_n$, and when the input carry value is '1', sum $S_n$ is the result of performing an XNOR operation on input data $X_n$ and $Y_n$.

Figure 9:
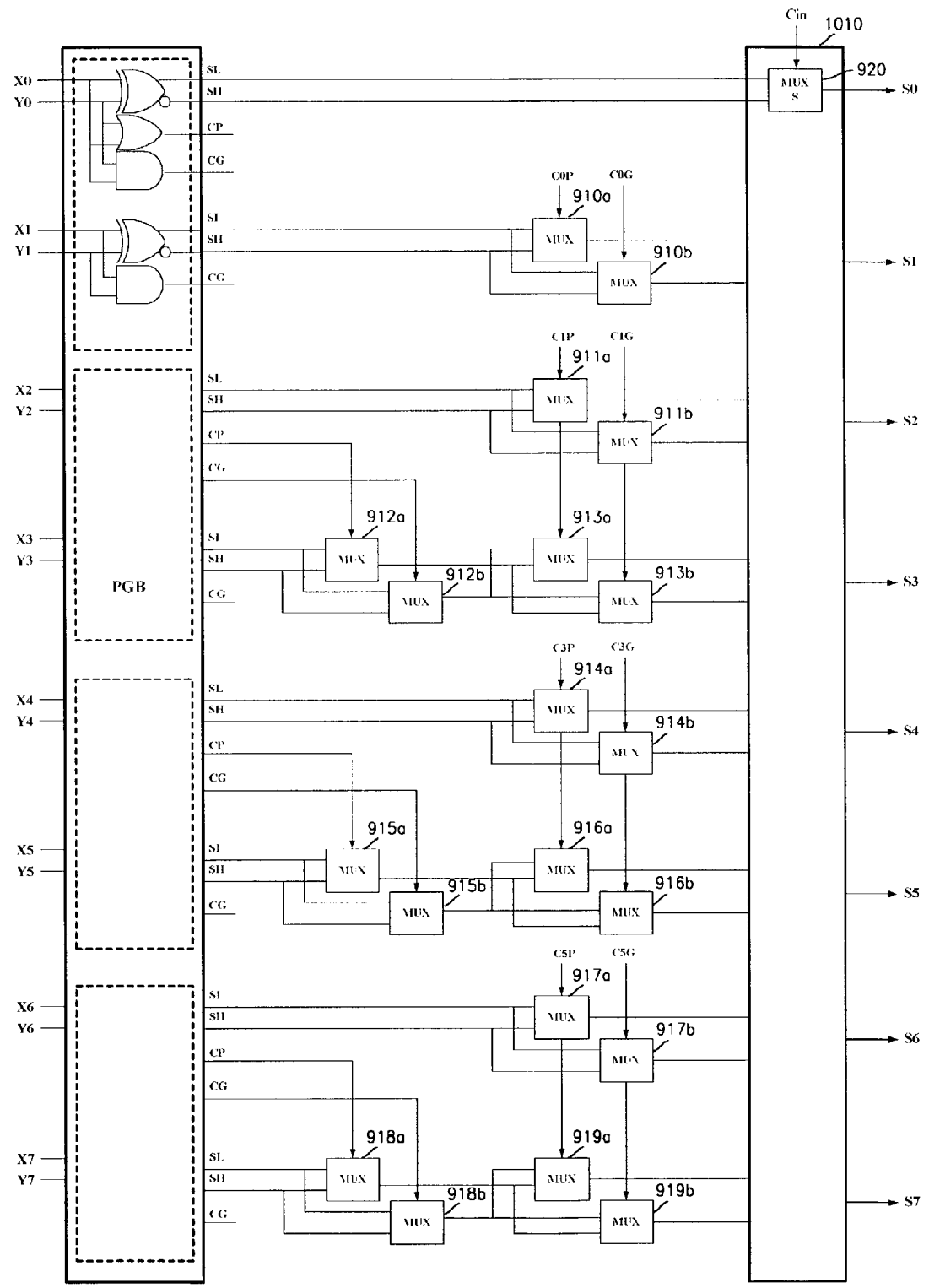
FIG. 9 is a block diagram of a sum generating block of the 8-bit conditional select adder module shown in FIG. 6.

FIG. 9 is a block diagram of a sum generating block 614 designed using this relationship. The sum generating block 614 receives XNOR value SH, XOR value SL, OR value CP, and AND value CG of data $X_n$ and $Y_n$, input from the pre-carry-sum block 612, and carry propagation values (C0P, C1P, C3P, C5P) and carry generation values (C0G, C1G, C3G, C5G) input from the carry generating block 616, and based on the received values, obtains a sum in each of two cases according to the presence of a carry of two data $X_n$ ($X_0$, $X_1$, $X_2$, $X_3$, $X_4$, $X_5$, $X_6$, $X_7$) and $Y_n$ ($Y_0$, $Y_1$, $Y_2$, $Y_3$, $Y_4$, $Y_5$, $Y_6$, $Y_7$). Then, according to the presence of a carry, sum $S_n$ ($S_0$, $S_1$, $S_2$, $S_3$, $S_4$, $S_5$, $S_6$, $S_7$) of each case is output by a MUX in the sum selection unit 1010 of the sum generating block 614 shown in FIG. 9, Referring to FIG. 9, the operation of the sum generating block 614 will now be explained in detail. The XOR value SL and XNOR value SH of input data $X_0$ and $Y_0$ are input respectively to MUXs of the sum selection block 1010, and are selectively output according to the value of carry input signal Cin input to the sum selection block 920. In the present embodiment, when the carry input signal Cin is '0', the XOR value SL of the input data $X_0$ and $Y_0$ is selected, and when the carry input signal Cin is '1', the XNOR value SH of the input data $X_0$ and $Y_0$ is selected. Then the selected value is output as sum So of the input data $X_0$ and $Y_0$.

Also, sum S1 of input data $X_1$ and $Y_1$ is calculated according to the following method.

The XOR value SL and XNOR value SH of input data $X_1$ and $Y_1$ are input respectively to the two input units of MUX 910a. Carry propagation value C0P, which functions as a selection signal, and is generated in the carry generation block 616, is input to the selection unit of the MUX 910a. According to the input carry propagation value C0P, either the input XOR value SL or XNOR value SH of input data $X_1$ and $Y_1$ is selectively output. In the present embodiment, when the input carry propagation value C0P is '0', the XOR value SL of the input data $X_1$ and $Y_1$ is selected, and when the input carry propagation value C0P is '1', the XNOR value SH of the input data $X_1$ and $Y_1$ is selected, and the selected value is output to the sum selection unit 1010.

Also, the XOR value SL and XNOR value SH of input data $X_1$ and $Y_1$ are input respectively to the two input units of the MUX 910b. Carry generation value C0G, which functions as a selection signal, and is generated in the carry generation block 616, is input to the selection unit of the MUX 910b. According to the input carry generation value C0G, either the input XOR value SL or XNOR value SH of input data $X_1$ and $Y_1$ is selectively output.

In the present embodiment, when the input carry generation value C0G is '0', the XOR value SL of the input data $X_1$ and $Y_1$ is selected, and when the input carry generation value C0G is '1', the XNOR value SH of the input data $X_1$ and $Y_1$ is selected, and the selected value is output to the sum selection unit 1010.

The outputs of the MUXs 910a and 910b are input to the sum selection unit 1010. One of the input values from the MUXs 910a and 910b is selected and output as sum S1 of the input data $X_1$ and $Y_1$, according to the carry input signal Cin value, in the same manner as calculating the sum of input data $X_0$ and $Y_0$ described above. In the present embodiment, when the carry input signal Cin is '0', the input value from the MUX 910a is selected, and when the carry input signal Cin is '1', the input value from the MUX 910b is selected, and the selected value is output as the sum $S_1$.

Also, sum $S_2$ of the input data $X_2$ and $Y_2$ is calculated according to the following method.

The XOR value SL and XNOR value SH of input data $X_2$ and $Y_2$ are input respectively to the two input units of MUX 911a. Carry propagation value C1P, which functions as a selection signal, and is generated in the carry generation block 616, is input to the selection unit of the MUX 911a. According to the input carry propagation value C1P, either the input XOR value SL or XNOR value SH of input data $X_2$ and $Y_2$ is selectively output. In the present embodiment, when the input carry propagation value C1P is '0', the XOR value SL of the input data $X_2$ and $Y_2$ is selected, and when the input carry propagation value C1P is '1', the XNOR value SH of the input data $X_2$ and $Y_2$ is selected, and the selected value is output to the sum selection unit 1010.

Also, the XOR value SL and XNOR value SH of input data $X_2$ and $Y_2$ are input respectively to the two input units of the MUX 910b. Carry generation value C1G, which functions as a selection signal, and is generated in the carry generation block 616, is input to the selection unit of the MUX 910b. According to the input carry generation value C1G, either the input XOR value SL or XNOR value SH of input data $X_2$ and $Y_2$ is selectively output.

In the present embodiment, when the input carry generation value C1G is '0', the XOR value SL of the input data $X_1$ and $Y_1$ is selected, and when the input carry generation value C1G is '1', the XNOR value SH of the input data $X_1$ and $Y_1$ is selected, and the selected value is output to the sum selection unit 1010.

The outputs of the MUXs 911a and 911b are input to the sum selection unit 1010. One of the input values from the MUXs 910a and 910b is selected and output as sum $S_2$ of the input data $X_2$ and $Y_2$, according to the carry input signal Cin value, in the same manner as calculating the sum of input data $X_1$ and $Y_1$ described above. In the present embodiment, when the carry input signal Cin is '0', the input value from the MUX 911a is selected, and when the carry input signal Cin is '1', the input value from the MUX 911b is selected, and the selected value is output as the sum $S_2$.

Also, sum $S_3$ of the input data $X_3$ and $Y_3$ is calculated according to the following method.

The XOR value SL and XNOR value SH of input data $X_3$ and $Y_3$ are input respectively to the two input units of MUX 912a. Carry propagation value CP of input data $X_2$ and $Y_2$, which functions as a selection signal, is input to the selection unit of the MUX 912a. According to the input carry propagation value CP, either the input XOR value SL of input data $X_3$ and $Y_3$, input to the first input unit, or XNOR value SH of input data $X_3$ and $Y_3$, input to the second input unit, is selectively output.

In the present embodiment, when the input carry propagation value CP is '0', the XOR value SL of the input data $X_3$ and $Y_3$ input to the first input unit is selected, and when the input carry propagation value CP is '1', the XNOR value SH of the input data $X_3$ and $Y_3$ input to the second input unit is selected, and the selected value is output to the input units of the MUXs 913a and 913b.

Also, the XOR value SL and XNOR value SH of input data $X_3$ and $Y_3$ are input respectively to the two input units of the MUX 912b. Carry generation value CG of input data $X_2$ and $Y_2$, which functions as a selection signal, is input, to the selection unit of the MUX 912b. According to the input carry generation value CG, either the input XOR value SL of input data $X_3$ and $Y_3$, input to the first input unit, or XNOR value SH of input data $X_3$ and $Y_3$, input to the second input unit, is selectively output. In the present embodiment, when the input carry generation value CG is '0', the XOR value SL of the input data $X_3$ and $Y_3$ is selected, and when the input carry generation value CG is '1', the XNOR value SH of the input data $X_3$ and $Y_3$ is selected, and the selected value is output to the MUXs 913a and 913b.

The output values of the MUXs 912a and 912b are input respectively to the two input units of the MUX 913a, and C1P generated in the carry generating block 616 is input to the selection unit of the MUX 913a. According to the input carry propagation value C1P, one of the input values from the MUXs 912a and 912b is selectively output. In the present embodiment, when the input carry propagation value C1P is '0', the input value from the MUX 912b is selected, and when the input carry propagation value C1P is '1', the input value from the MUX 912a is selected, and the selected value is output to the sum selection unit 1010.

Also, the output values of the MUXs 912a and 912b are input respectively to the two input units of the MUX 913b, and C1G generated in the carry generating block 616 is input to the selection unit of the MUX 913b. According to the input carry generation value C1G, one of the input values from the MUXs 912a and 912b is selectively output. In the present embodiment, when the input carry generation value C1G is '0', the input value from the MUX 912b is selected, and when the input carry propagation value C1P is '1', the input value from the MUX 912a is selected, and the selected value is output to the sum selection unit 1010.

In the sum selection unit 1010, according to the carry input signal Cin value, one of the input values from the MUXs 913a and 913b is selected and output as sum $S_3$ of the input data $X_3$ and $Y_3$, in the same manner as calculating the sum of input data $X_2$ and $Y_2$ described above. In the present embodiment, when the carry input signal Cin is '0', the input value from the MUX 913a is selected, and when the carry input signal Cin is '1', the input value from the MUX 913b is selected, and the selected value is output as the sum S3 of the input data $X_3$ and $Y_3$.

The sums of input data $X_4$, $Y_4$, $X_5$, $Y_5$, $X_6$, $Y_6$, $X_7$, and $Y_7$ are calculated in the same manner as calculating the sums of $X_2$, $Y_2$, $X_3$, and $Y_3$ described above.

Thus, the sum generating block 614 does not use NAND or NOR gates, and therefore needs less internal wiring. Accordingly, delay time, chip area, and power consumption are less. Also, by using carry propagation values (C0P, C1P, C3P, C5P) and carry generation values (C0G, C1G, C3G, C5G) input from the carry generating block 616, the sum generating block 614 eliminates a need for separate carry generating logic, thereby simplifying wiring and logic.

Figure 5:
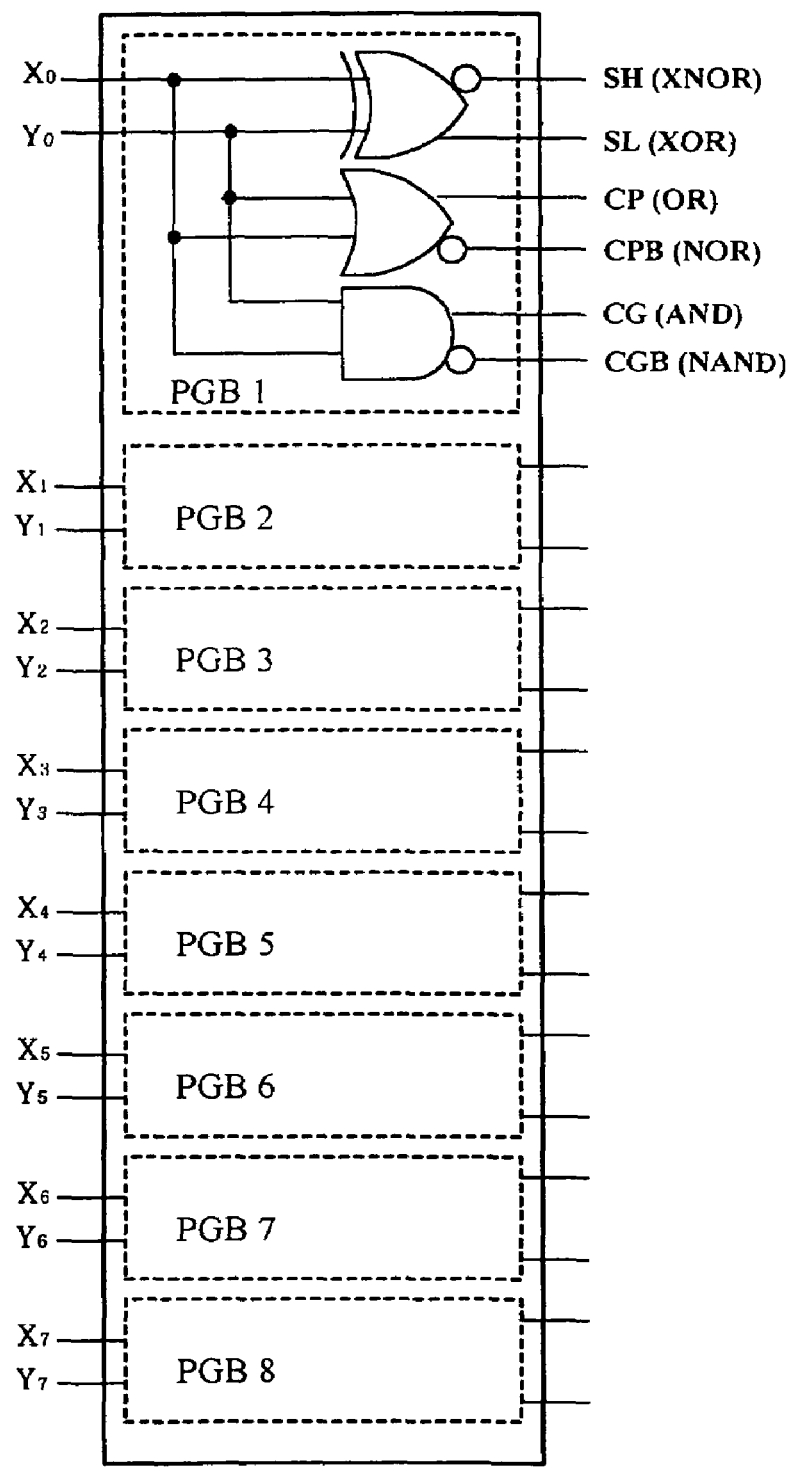
FIG. 5 is a block diagram of a pre-carry-sum generating block shown in FIG. 1.
Figure 7:
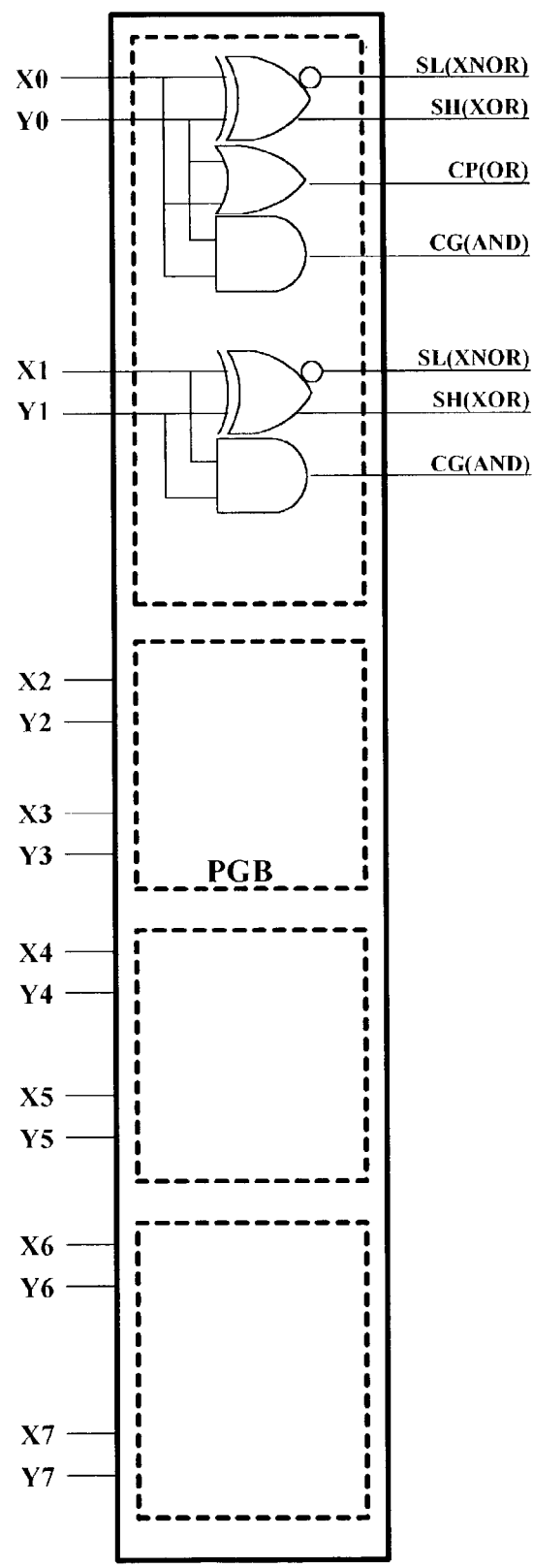
FIG. 7 is a block diagram of a pre-carry-sum generating block shown in FIG. 6.

Thus, since the carry generating block 616 and sum generating block 614 according to the present invention need only XNOR value SH, XOR value SL, OR value CP, and AND value CG of two input data $X_n$ and $Y_n$ from the pre-carry-sum generating block 612, the pre-carry-sum generating block 612 according to the present invention, as shown in FIG. 7, needs only logic for XNOR, XOR, OR, and AND operations, unlike the prior art pre-carry-sum generating block 112 shown in FIG. 5. Therefore, the conditional select adder according to the present invention has less fan-out than the prior art adder, and does not need NAND or NOR gates, reducing internal wiring, chip area, and power consumption.

Referring to the carry generating block of FIG. 8 and the sum generating block of FIG. 9, a process for obtaining the sum of two 4-bit binary numbers when $X_0=1$, $X_1=0$, $X_2=1$, $X_3=1$, $Y_0=1$, $Y_1=0$, $Y_2=0$, $Y_3=1$, that is, 1101+1001=10110, will now be explained according to a preferred embodiment of the present invention.

First, referring to the carry generating block of FIG. 8, in the pre-carry-sum generating block 612, the result of performing an OR operation on input data $X_0$ and $Y_0$, '1', and the result of performing an AND operation on input data $X_0$ and $Y_0$, '1', are output as signal CP and signal CG, respectively, and are input as signal C0P to MUX 910a and signal C0G to MUX 910b, respectively, of the sum generating block 614 shown in FIG. 9.

Also, the result of performing an AND operation on $X_0$ and $Y_0$, '1', is input as an initial carry value to the first input unit of MUX 811a, and the result of performing an AND operation on $X_1$ and $Y_1$, '0', is input to the second input unit. The result of performing an XNOR operation on $X_1$ and $Y_1$, '1', is input to the selection unit of the MUX 811a, and according to this, the result of performing an AND operation on $X_1$ and $Y_1$ which is input to the second input unit, '0', is selected and output as signal C1G to the sum generating block 614.

Also, the result of performing an AND operation on $X_1$ and $Y_1$, '0', is input to the first input unit of MUX 811b, and the result of performing an OR operation on $X_0$ and $Y_0$, '1', is input as an initial carry value to the second input unit. The result of performing an XOR operation on $X_1$ and $Y_1$, '0', is input to the selection unit of the MUX 811b, and according to this, the result of performing an AND operation on $X_1$ and $Y_1$ input to the first input unit, '0', is selected and output as signal C1P to the sum generating block 614.

The result of performing an AND operation on $X_2$ and $Y_2$, '0', is input as an initial carry value to the first input unit of MUX 812a, and the result of performing an AND operation on $X_3$ and $Y_3$, '1', is input to the second input unit. The result of performing an XNOR operation on $X_3$ and $Y_3$, '1', is input to the selection unit of the MUX 812a, and according to this, the result of performing an AND operation on $X_3$ and $Y_3$ which is input to the second input unit, '1', is selected and output to the first input units of MUXs 813a and 813b.

The result of performing an AND operation on $X_3$ and $Y_3$, '1', is input to the selection unit of the MUX 812a, and the result of performing an OR operation on $X_2$ and $Y_2$, '1', is input as an initial carry value to the second input unit. The result of performing an XOR operation on $X_3$ and $Y_3$, '0', is input to the selection unit of the MUX 812b, and according to this, the result of performing an AND operation on $X_3$ and $Y_3$ input to the first input unit, '1', is selected and output to the second input units of MUXs 813a and 813b.

The output value of the MUX 811b, '0', is input to the selection unit of the MUX 813a, and according to this, the input value, '1', which is input to the first input unit, is selected and output as signal C3P to the sum generating block 614.

The output value of the MUX 811a, '0', is input to the selection unit of the MUX 813b, and according to this, the input value, '1', which is input to the first input unit, is selected and output as signal C3G to the sum generating block 614.

Referring to the sum generating block 614 shown in FIG. 9, first, the result of performing an XOR operation on the input data $X_0$ and $Y_0$, '0', and the result of performing an XNOR operation on the input data $X_0$ and $Y_0$, '1', are input to the first input unit and second input unit, respectively, of the MUX of the sum selection unit 1010, as two input signals for determining sum $S_0$ according to the initial carry value Cin. that is, a first selection signal and a second selection signal.

Also, the result of performing an XOR operation on $X_1$ and $Y_1$, '0', is input to the first input unit of the MUX 910a, and the result of performing an XNOR operation on $X_1$ and $Y_1$, '1', is input to the second input unit. The C0P value which is input from the carry generating block 616, '1', is input to the selection unit of the MUX 910a, and according to this, the result of performing an XNOR operation on $X_1$ and $Y_1$ which is input to the second input unit, '1', is selected and output to the first input unit of a corresponding MUX of the sum selection unit 1010, as the first selection signal of the two selection signals for calculating sum $S_1$.

The result of performing an XOR operation on $X_1$ and $Y_1$, '0', is input to the first input unit of the MUX 910b, and the result of performing an XNOR operation on $X_1$ and $Y_1$, '1', is input to the second input unit. The C0G value, '1', which is input from the carry generating block 616, is input to the selection unit of the MUX 910b, and according to this, the result of performing an XNOR operation on $X_1$ and $Y_1$ which is input to the second input unit, '1', is selected and output to the sum selection unit 1010, as the second selection signal of the two selection signals for calculating sum $S_1$.

Also, the result of performing an XOR operation on $X_2$ and $Y_2$, '1', is input to the first input unit of the MUX 911a, and the result of performing an XNOR operation on $X_2$ and $Y_2$, '0', is input to the second input unit. The C1P value input from the carry generating block 616, '0', is input to the selection unit of the MUX 911a, and according to this, the result of performing an XOR operation on $X_2$ and $Y_2$ which is input to the first input unit, '1', is selected and output to the sum selection unit 1010, as the first selection signal of the two selection signals for calculating sum $S_2$.

The result of performing an XOR operation on $X_2$ and $Y_2$, '1', is input to the first input unit of the MUX 911$b$, and the result of performing an XNOR operation on $X_2$ and $Y_2$, '0', is input to the second input unit. The C1G value, '0', which is input from the carry generating block 616, is input to the selection unit of the MUX 911$b$, and according to this, the result of performing an XOR operation on $X_2$ and $Y_2$ which is input to the first input unit, '1', is selected and output to the sum selection unit 1010, as the second selection signal of the two selection signals for calculating sum $S_2$.

Also, the result of performing an XOR operation on $X_3$ and $Y_3$, '0', is input to the first input unit of the MUX 912$a$, and the result of performing an XNOR operation on $X_3$ and $Y_3$, '1', is input to the second input unit. The result of performing an OR operation on $X_2$ and $Y_2$, '1', is input as a selection signal to the selection unit of the MUX 912$a$, and according to this, the result of performing an XNOR operation on $X_3$ and $Y_3$ which is input to the second input unit, '1', is selected and output to the second input units of the MUXs 913$a$ and 913$b$.

The result of performing an XOR operation on $X_3$ and $Y_3$, '0', is input to the first input unit of the MUX 912$b$, and the result of performing an XNOR operation on $X_3$ and $Y_3$, '1', is input to the second input unit. The result of performing an AND operation on $X_2$ and $Y_2$, '0', is input as a selection signal to the selection unit of the MUX 912$b$, and according to this, the result of performing an XOR operation on $X_3$ and $Y_3$ which is input to the first input unit, '0', is selected and output to the first input units of the MUXs 913$a$ and 913$b$.

Also, C1P, '0', which is the output signal of the carry generating block 616, is input to the selection unit of the MUX 913$a$, and according to this, the value input to the first input unit, '0', is selected and output to the sum selection unit 1010 as the first selection signal of the two selection signals for calculating sum $S_3$.

Signal C1G, '0', which is the output signal of the carry generating block 616, is input to the selection unit of the MUX 913$b$, and according to this, the value input to the first input unit, '0', is selected and output to the sum selection unit 1010 as the second selection signal of the two selection signals for calculating sum $S_3$.

Since the initial carry input signal Cin is '0', the MUXs of the sum selection unit 1010 select the first selection signals as the resulting values of sum $S_0$, $S_1$, $S_2$, and $S_3$, and output '0110'.

Figure 10:
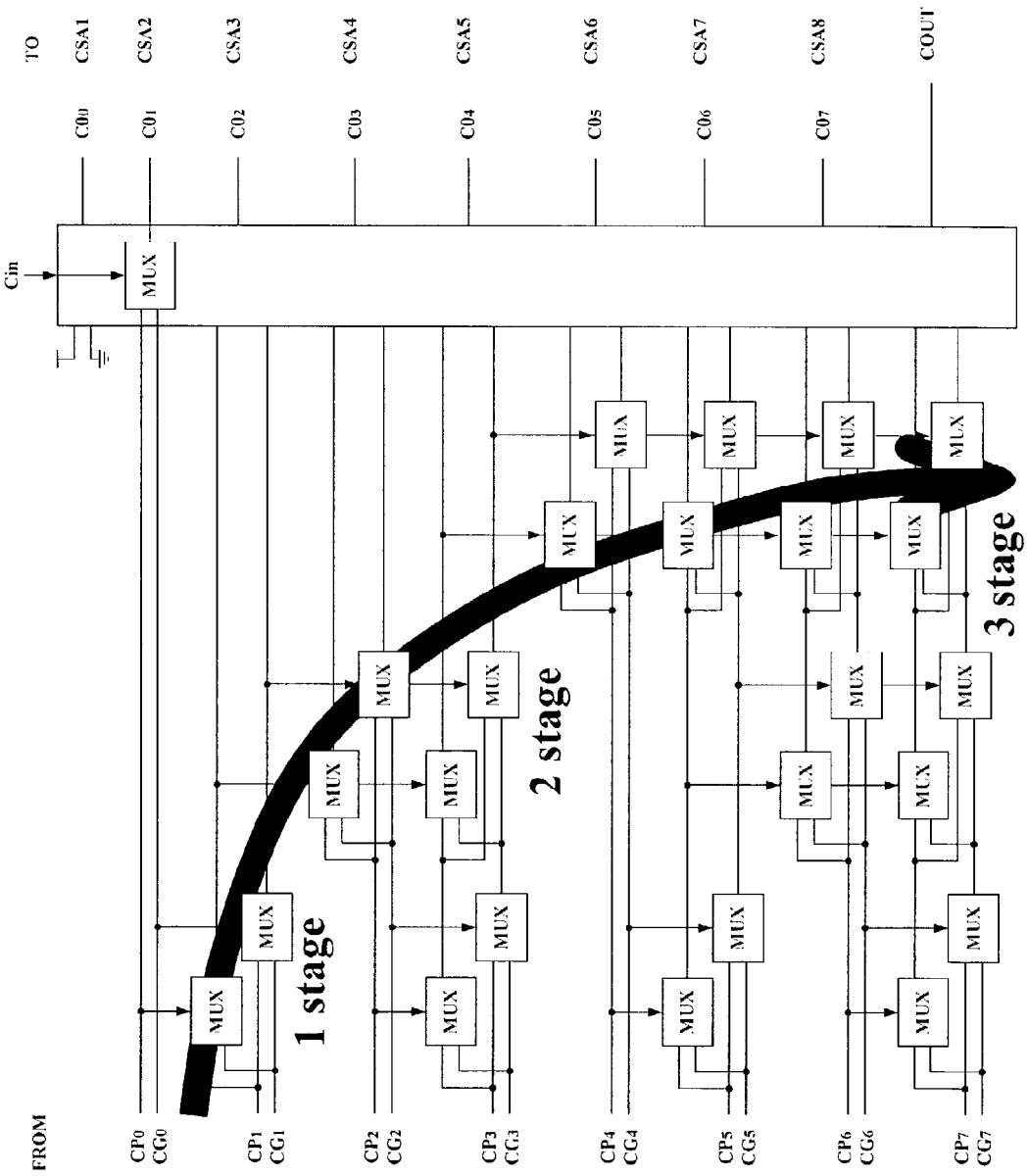
FIG. 10 is a block diagram of a block carry generating block shown in FIG. 6.

FIG. 10 is a block diagram of the block carry generating block. As shown in FIG. 10, the block carry generating block 690 calculates block carries ($CO_0$, $CO_1$, $CO_2$, $CO_3$, $CO_4$, $CO_5$, $CO_6$, $CO_7$), based on carry propagation values ($CP_0$, $CP_1$, $CP_2$, $CP_3$, $CP_4$, $CP_5$, $CP_6$, $CP_7$) and carry generation values ($CG_0$, $CG_1$, $CG_2$, $CG_3$, $CG_4$, $CG_5$, $CG_6$, $CG_7$) which are input from the carry generating blocks of the conditional select addition modules 610 through 680, and carry input Cin to the block carry generating block 690. Thus calculated block carries are fed back to the sum calculating blocks of the conditional select addition modules 610 through 680, and the sum calculating blocks select appropriate sums according to the block carry values, that is, according to the presence of a carry.

Figure 1:
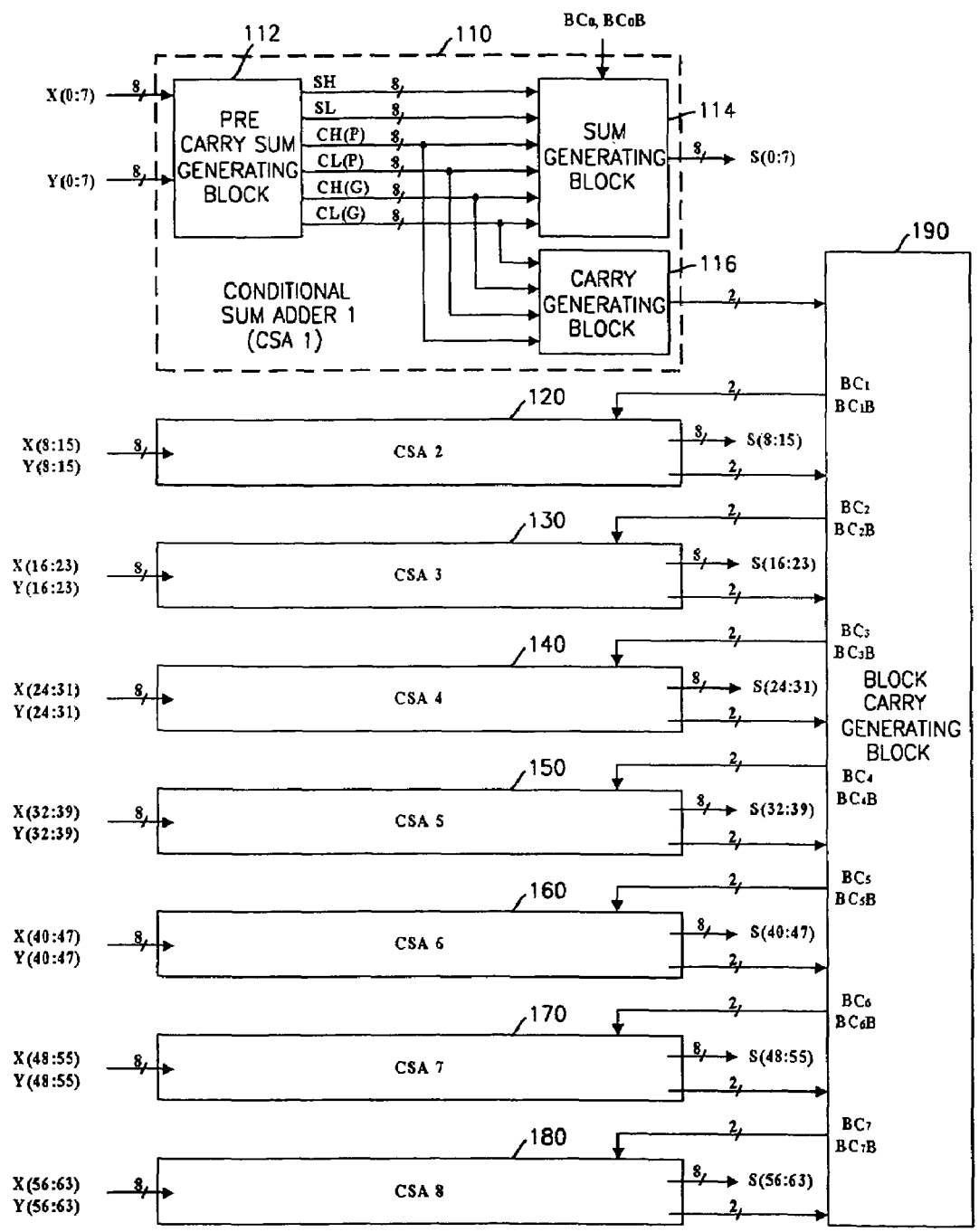
FIG. 1 is a schematic diagram of a prior art 64-bit conditional select adder.
Figure 2:
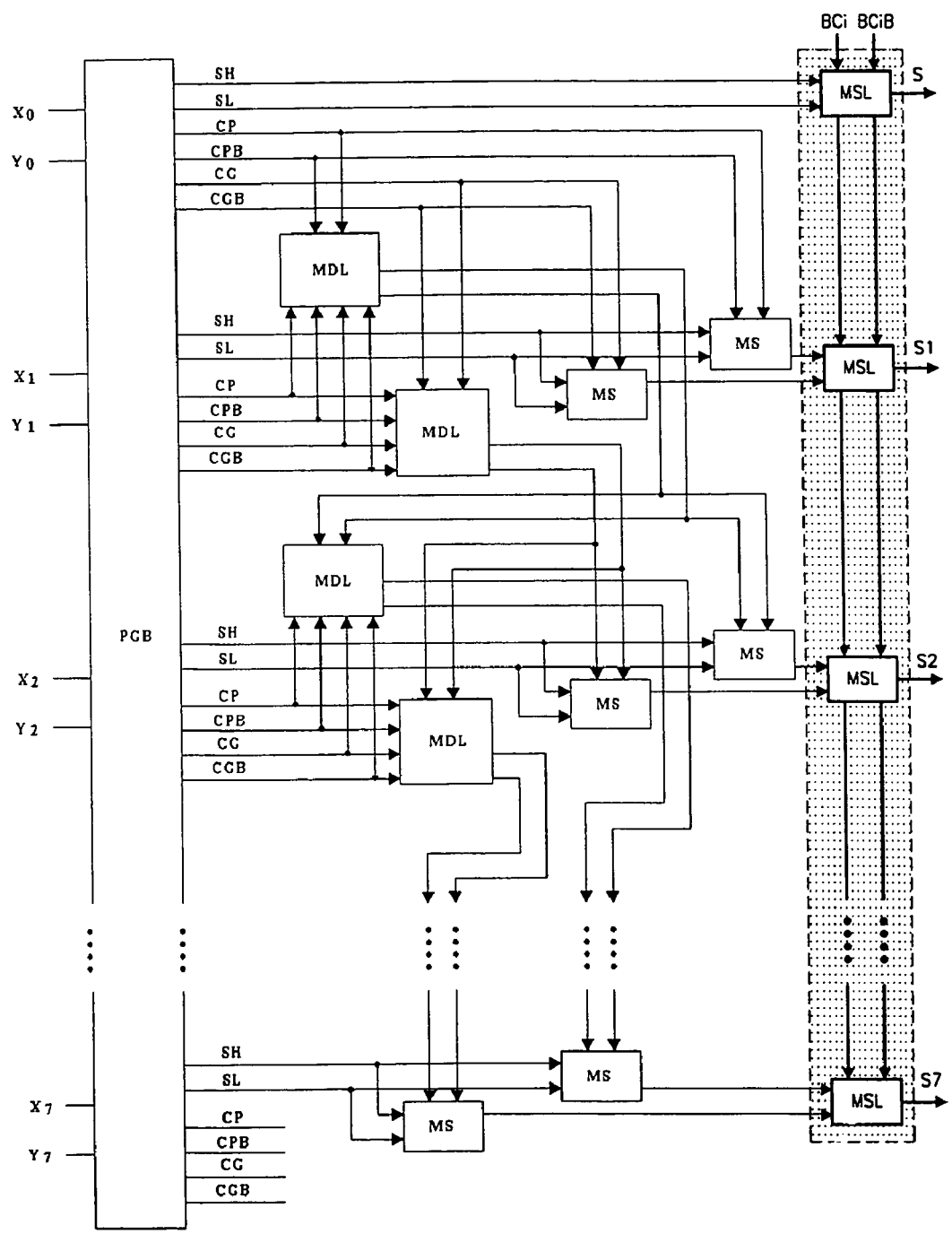
FIG. 2 is a block diagram of a sum generating block of an 8-bit conditional select adder module shown in FIG. 1.
Figure 3:
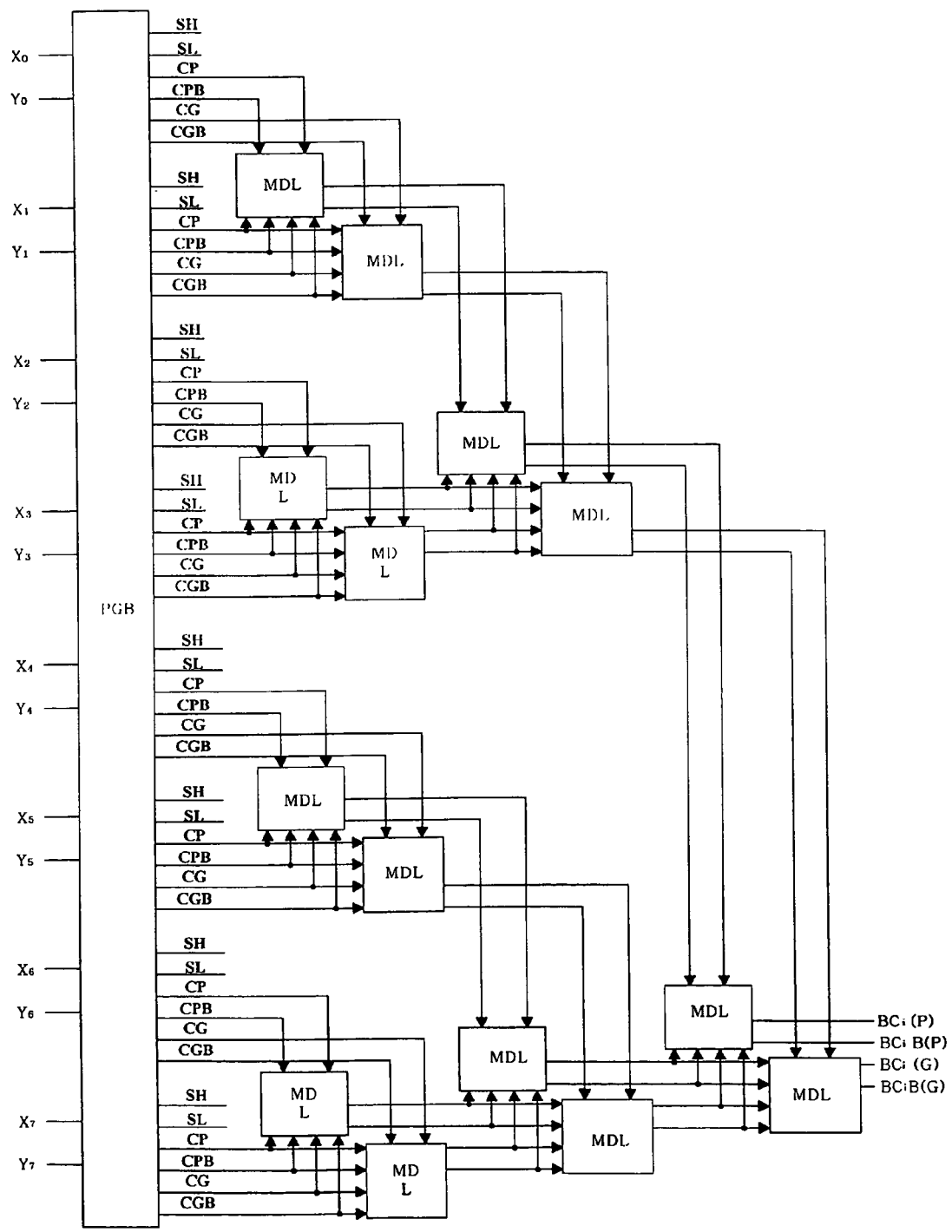
FIG. 3 is a block diagram of a carry generating block of the 8-bit conditional select adder module shown in FIG. 1.
Figure 4:
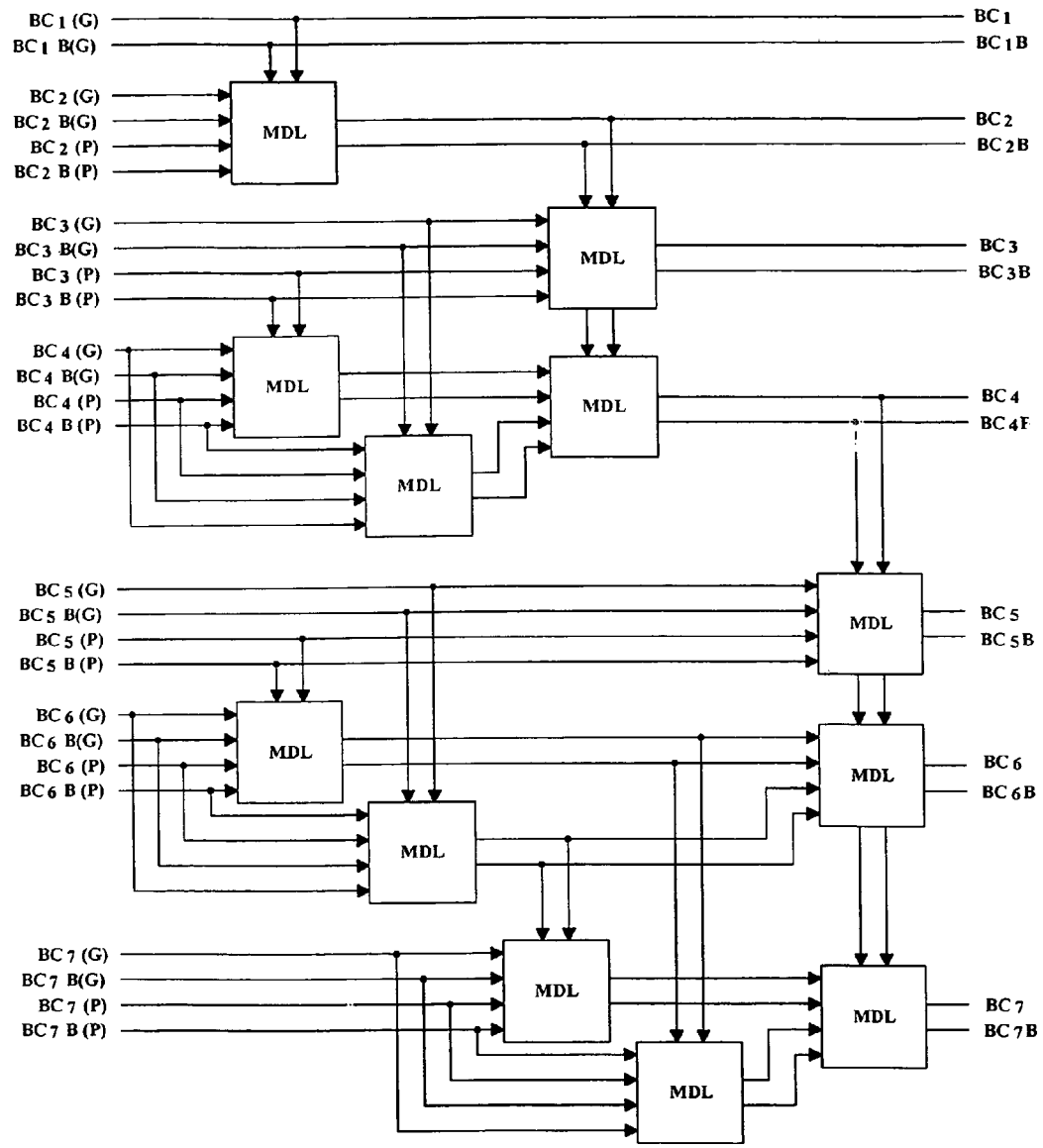
FIG. 4 is a block diagram of a block carry generating block shown in FIG. 1.

Therefore, in the prior art block carry calculating block 190 shown in FIG. 4, block carries BC0 through BC7 are not output in synchronization, while the block carry calculating block 690 according to the present invention synchronizes the calculated block carries ($CO_0$, $CO_1$, $CO_2$, $CO_3$, $CO_4$, $CO_5$, $CO_6$, $CO_7$) such that sums of the conditional select modules are synchronized.

Also, the gate count and critical paths of the 64-bit conditional select adder according to the present invention are far less than those of the prior art, and the internal wiring of the present invention is also much simpler than the prior art.

TABLE 3

| Classification | Gate count | Critical path | Internal wiring |
|---|---|---|---|
| Prior art adder | 588 | 7 stages | Complicated |
| Present invention | 524 | 3 stages | Simple |

The conditional select adding apparatus and method according to the present invention can be applied to a wide area in relation to digital signal processing.

So far, optimum embodiments have been explained in the drawings and specification, and specific terminology is used here only to explain the present invention. Therefore, the present invention is not restricted to the above-described embodiments, and many variations are possible within the spirit and scope of the present invention. The scope of the present invention is not determined by the description but by the accompanying claims.

As described above, the adder according to the present invention has reduced gate count, critical paths, and internal wiring, requiring less chip area, delay time, and power consumption.

What is claimed is:

1. A carry generator for generating a carry of input data $X_i$ and $Y_i$ according to an initial carry, the carry generator comprising:
    a first input unit which receives predetermined data based on the input data $X_i$ and $Y_i$;
    a second input unit which receives the initial carry; and
    a selection unit which receives the result of performing an XOR operation on the input data $X_i$ and $Y_i$,
    wherein according to the XOR result, either predetermined data based on both the input data $X_i$ and the input $Y_i$ input to the first input unit, or the initial carry input to the second input unit is selected and output as a carry,
    wherein the initial carry is the result of performing an OR operation on input data $X_{i-1}$ and $Y_{i-1}$.

2. The carry generator of claim 1, wherein the data based on $X_i$ and $Y_i$ is either the result of performing an AND operation on $X_i$ and $Y_i$, or the result of performing an OR operation on $X_i$ and $Y_1$.

3. A carry generator which generates a carry of two n-bit input data units $X_0$-$X_{n-1}$, and $Y_0$-$Y_{n-1}$, the carry generator comprising one or more first sub-carry generating units, each of which comprises:
    a first input unit which receives data based on input data $X_{2i-1}$ and $Y_{2i-1}$;
    a second input unit which receives initial carry data; and
    a selection unit which receives the result of performing an XOR operation on the input data $X_{2i-1}$ and $Y_{2i-1}$,
    wherein according to the XOR result, the first sub-carry generating unit selects either data based on both input data $X_{2i-1}$ and input data $Y_{2i-1}$ input to the first input unit, or the initial carry data input to the second input unit, and outputs the selected data, and
    wherein the initial carry data is the result of performing an OR operation on input data $X_{2i-1}$ and $Y_{2i-1}$.

4. A carry generator which generates a carry of two n-bit input data units $X_0$-$X_{n-1}$, and $Y_0$-$Y_{n-1}$, the carry generator comprising one or more first sub-carry generating units, each of which comprises:
a first input unit which receives data based on input data $X_{2i-1}$ and $Y_{2i-1}$;
a second input unit which receives initial carry data;
a selection unit which receives the result of performing an XOR operation on the input data $X_{2i-1}$ and $Y_{2i-1}$,
wherein according to the XOR result, the first sub-carry generating unit selects either data based on both input data $X_{2i-1}$ and input data $Y_{2i-1}$ input to the first input unit, or the initial carry data input to the second input unit, and outputs the selected data;
one or more second sub-carry generating units, each of which comprises:
a first input unit which receives initial carry data;
a second input unit which receives data based on input data $X_{2i-1}$ and $Y_{2i-1}$; and
a selection unit which receives the result of performing an XNOR operation on the input data $X_{2i-1}$ and $Y_{2i-1}$,
wherein according to the XNOR result input to the selection unit, the second sub-carry generating unit selects either the initial carry data input to the first input unit, or the data based on input data $X_{2i-1}$ and $Y_{2i-1}$ input to the second input unit, and outputs the selected data, and
wherein the initial carry data of the second sub-carry generating unit is the result of performing an AND operation on the input data $X_{2i-1}$ and $Y_{2i-1}$.

5. The carry generator of claim 4, wherein the data based on $X_{2i-1}$ and $Y_{2i-1}$ is either the result of performing an AND operation on $X_{2i-1}$ and $Y_{2i-1}$, or the result of performing an OR operation on $X_{2i-1}$ and $Y_{2i-1}$.

6. A conditional select adder which comprises a plurality of addition modules, each of which has a carry generating unit which generates the carry of two n-bit input data units $X_0$-$X_{n-1}$, and $Y_0$-$Y_{n-1}$, and a sum generating unit which generates the sum of the input values; and a block carry generating unit which in response to the carries generated by the addition modules, determines the presence of a carry of each of the addition modules, and feeds the result back to the next stage addition module, wherein each carry generating unit comprises:
one or more first sub-carry generating units, each of which comprises a first input unit which receives data based on input data $X_{2i-1}$ and $Y_{2i-1}$; a second input unit which receives initial carry data; and a first selection unit which receives the result of performing an XOR operation on the input data $X_{2i-1}$ and $Y_{2i-1}$, wherein according to the XOR result input to the selection unit, the first sub-carry generating unit selects either data based on the input data $X_{2i-1}$ and $Y_{2i-1}$ input to the first input unit, or the initial carry data input to the second input unit, and outputs the selected data;
one or more second sub-carry generating units, each of which comprises a first input unit which receives initial carry data; a second input unit which receives data based on input data $X_{2i-1}$ and $Y_{2i-1}$; and a second selection unit which receives the result of performing an XNOR operation on the input data $X_{2i-1}$ and $Y_{2i-1}$, wherein according to the XNOR result input to the selection unit, the second sub-carry generating unit selects either the initial carry data input to the first input unit or the data based on input data $X_{2i-1}$ and $Y_{2i-1}$ input to the second input unit, and outputs the selected data; and
one or more carry selection units, each of which has two input units to which the outputs of the first sub-carry generating unit and the second sub-carry generating unit are input, and a third selection unit to which a predetermined selection signal is input, wherein according to the selection signal input to the selection unit, one of the values input to the input units is output.

7. The conditional select adder of claim 6, wherein when the XOR result input to the first selection unit is '0', the first sub-carry generating unit outputs the data input to the first input unit, and when the XOR result input to the first selection unit is '1', outputs the initial carry data input to the second input unit, and when the XNOR result input to the second selection unit is '0', the second sub-carry generating unit outputs the initial carry data input to the first input unit, and when the XNOR result input to the second selection unit is '1', outputs the data input to the second input unit.

8. The conditional select adder of claim 6, wherein the initial carry data of the first sub-carry generating unit is the result of performing an OR operation on the input data $X_{2i-2}$ and $Y_{2i-2}$, and the initial carry data of the second sub-carry generating unit is the result of performing an AND operation on the input data $X_{2i-2}$ and $Y_{2i-2}$.

9. The conditional select adder of any one of claims 6 through 8, wherein the data based on $X_{2i-1}$ and $Y_{2i-1}$ is either $X_{2i-1}$ or $Y_{2i-1}$, or the result of performing an AND operation on $X_{2i-1}$ and $Y_{2i-1}$, or the result of performing an OR operation on $X_{2i-1}$ and $Y_{2i-1}$.

10. The conditional select adder of claim 6, wherein the predetermined selection signal is the output value of the sub-carry generating unit or the carry selection unit of the previous stage.

11. The conditional select adder of claim 6, wherein the sum generating unit calculates a sum by using the output of the carry generating unit.

12. The conditional select adder of claim 11, wherein the sum generating unit comprises one or more first sub-sum generating units, each of which comprises:
a fourth selection unit which receives the output of the carry generating unit; and
two input units to which data calculated based on two operands from among the input data is input.

13. The conditional select adder of claim 12, wherein the first sub-sum generating unit selectively outputs the data input to one of the two input units of the first sub-sum generating unit based on the value input to the fourth selection unit.

14. The conditional select adder of claim 12, wherein the sum generating unit comprises one or more second sub-sum generating units, each of which comprises:
a fifth selection unit to which carry data is input; and
two input units to which the results of performing an XOR operation on the two operands and performing an XNOR operation on the two operands are respectively input.

15. The conditional select adder of claim 14, wherein based on the carry value input to the fifth selection unit, the second sub-sum generating unit selects the data input to one of the two input units of the second sub-sum generating unit, and outputs the selected data to one of the two input units of the first sub-sum generating units.

16. The conditional select adder of claim 6, further comprising:
a pre-generating unit which generates one or more of the results of performing XOR, XNOR, OR, and AND operations on the input values $X_i$ and $Y_i$ by analyzing the input values $X_i$ and $Y_i$ to be added, and outputs the generated values to the carry generating unit and the sum generating unit.

17. A carry generating method which is used in an addition apparatus and generates a carry of two n-bit input data units $X_0$-$X_{n-1}$ and $Y_0$-$Y_{n-1}$, comprising:
(a) calculating predetermined data based on input data $X_{2i-1}$ and $Y_{2i-1}$;
(b) calculating first initial carry data of the input data $X_{2i-1}$ and $Y_{2i-1}$;
(c) calculating the result of performing an XOR operation on input data $X_{2i-1}$ and $Y_{2i-1}$; and
(d) according to the calculated result of performing an XOR operation on the input data $X_{2i-1}$ and $Y_{2i-1}$, selecting either the data based on both input data $X_{2i-1}$ and input data $Y_{2i-1}$, or the first initial carry data, and outputting the selected data as a first carry,
wherein the first initial carry data is the result of performing an AND operation on input data $X_{2i-2}$ and $Y_{2i-2}$.

18. The carry generating method of claim 17, wherein the data based on $X_{2i-1}$ and $Y_{2i-1}$ is either the result of performing an AND operation on $X_{2i-1}$ and $Y_{2i-1}$, or the result of performing an OR operation on $X_{2i-1}$ and $Y_{2i-1}$.

19. A carry generating method which is used in an addition apparatus and generates a carry of two n-bit input data units $X_0$-$X_{n-1}$ and $Y_0$-$Y_{n-1}$, comprising:
(a) calculating predetermined data based on input data $X_{2i-1}$ and $Y_{2i-1}$;
(b) calculating first initial carry data of the input data $X_{2i-1}$ and $Y_{2i-1}$;
(c) calculating the result of performing an XOR operation on input data $X_{2i-1}$ and $Y_{2i-1}$;
(d) according to the calculated result of performing an XOR operation on the input data $X_{2i-1}$ and $Y_{2i-1}$, selecting either the data based on both input data $X_{2i-1}$ and input data $Y_{2i-1}$, or the first initial carry data, and outputting the selected data as a first carry;
(a1) calculating the predetermined data based on the input data $X_{2i-1}$ and $Y_{2i-1}$;
(b1) calculating second initial carry data of the input data $X_{2i-1}$ and $Y_{2i-1}$;
(c1) calculating the result of performing an XNOR operation on the input data $X_{2i-1}$ and $Y_{2i-1}$; and
(d1) according to the calculated result of performing the XNOR operation on the input data $X_{2i-1}$ and $Y_{2i-1}$, selecting either the data based on the input data $X_{2i-1}$ and $Y_{2i-1}$, or the second initial carry data, and outputting the selected data as a second carry;
wherein the second initial carry data is the result of performing an AND operation on the input data $X_{2i-1}$ and $Y_{2i-1}$.

20. The carry generating method of claim 19, wherein the data based on $X_{2i-1}$ and $Y_{2i-1}$ is either the result of performing an AND operation on $X_{2i-1}$ and $Y_{2i-1}$, or the result of performing an OR operation on $X_{2i-1}$ and $Y_{2i-1}$.

* * * * *